July 6, 1965   N. J. HUGHES   3,192,818
THREADED NUT DEVICE WITH SHAVED WRENCH ENGAGING SURFACES
Filed Sept. 25, 1962
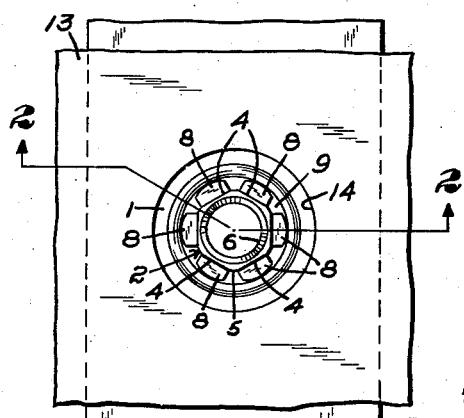
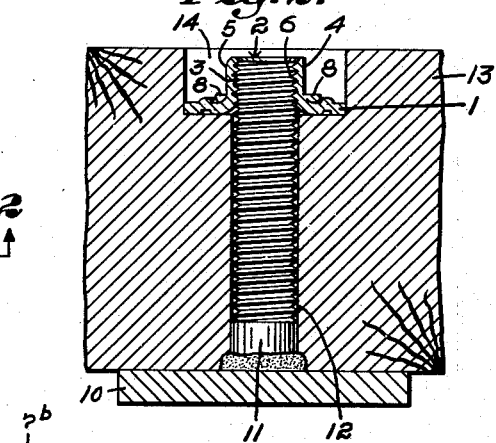
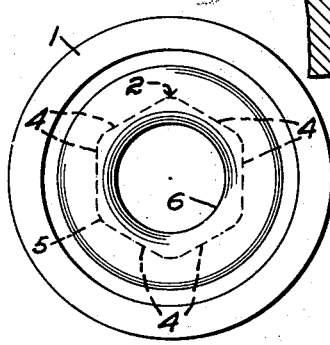
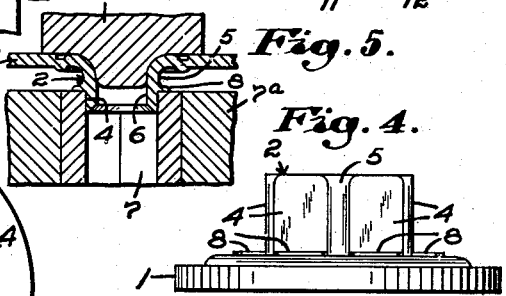
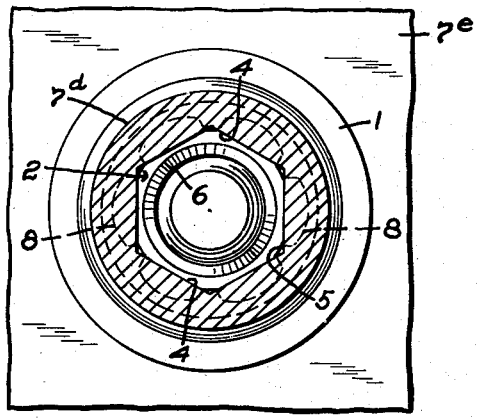
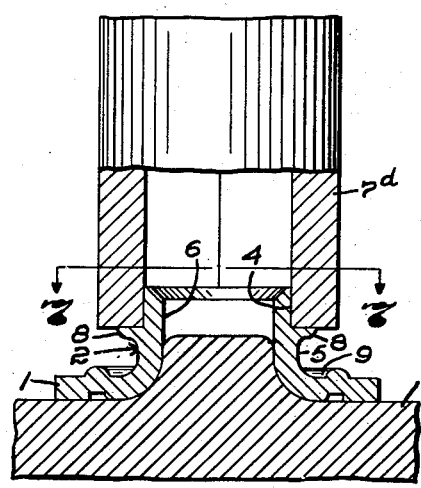
Inventor:
Norman J. Hughes,
by Walter S. Jones
Atty.

United States Patent Office 3,192,818
Patented July 6, 1965

3,192,818
THREADED NUT DEVICE WITH SHAVED
WRENCH ENGAGING SURFACES
Norman J. Hughes, Melrose, Mass., assignor to United-Carr Incorporated, a corporation of Delaware
Filed Sept. 25, 1962, Ser. No. 226,096
1 Claim. (Cl. 85—32)

This invention is directed to a new nut device having a threaded barrel portion formed from sheet metal and having a shaved outer wall on the barrel portion providing a tool engaging surface whereby the nut device may be engaged and held by a tool when rotated onto a screw threaded shank member.

The invention also relates to the method of forming the tool engaging surface or surfaces upon the outer threaded barrel portion of the nut device.

In the drawings which illustrate the invention:

FIG. 1 is an elevational view of a portion of an installation showing a use of the improved nut device;

FIG. 2 is a section taken on the line 2—2 of FIG. 1;

FIG. 3 is a bottom plan view of the improved nut device;

FIG. 4 is an edge view of the nut device shown in FIG. 3;

FIG. 5 is a diagrammatic section showing a method of shaving the outer surface of a nut during manufacture by pillar-press type of tools;

FIG. 6 is a section of an improved nut device showing a method of shaving the outer surface of the nut barrel portion during the manufacture of the nut by tools other than pillar-press types of tools, as for instance, by eyelet machine tools; and FIG. 7 is a section taken on the line 7—7 of FIG. 6 to show the shape of the shaving tool in cross section.

Heretofore sheet metal nuts having drawn barrels had been formed with tool engaging means providing for rotation of the nut or holding the nut during rotation of a cooperating screw such as is shown in United States Patents Nos. 2,096,335; 2,632,355; and 2,672,659. The nut device of the present invention and the method of forming the tool engaging surfaces are believed to be patentable improvements over the devices shown in those patents. The resulting nut device is simple, inexpensive to manufacture and has commercial advantages over the prior art.

Referring now to the nut device illustrated by the drawings there is shown a one-piece device drawn from a strip of suitable sheet metal by a series of drawing operations (not shown) as will be understood by anyone skilled in the art.

The particular nut device illustrated has a base flange 1, a thin walled barrel portion 2 having an internal thread 3 and a plurality of relatively flat tooling engaging portions 4 on the outer surface of the barrel portion 2 as shown in FIGS. 1, 3, and 4. Thus, the nut device shown has a hexagonal shaped outer wall 5 opposite the inner threaded circular wall 6. This arrangement provides for a compact nut device that may be readily used with a standard socket wrench or any other suitable gripping tool.

A method of forming the improved nut device is shown more or less diagrammatically in FIG. 5. In this instance the nut is shown as being formed from a strip (such as would be the case in a so-called pillar press machine) and a station is provided where a sciving tool 7 is located in the die part of the tools 7a. At this station (which is at the end of the die tools 7a) the punch part of the tools 7b pushes the nut, in the strip 7c, into the sciving tool 7 thereby shaving portions 8 from the outer wall of the barrel portion 2. Thus the flat surfaces 4 are formed on the outer wall 5 by this simple method of providing the sciving operation as a part of the forming of the improved nut during its manufacture and before it is cut from the strip 7c, as will be understood by anyone skilled in the art of forming this general type of nut in a set of progressive pillar press machine tools.

Another improved method of forming the nut device described above is to provide a suitable shaped shaving or sciving tool 7d (FIGS. 6 and 7) that may be built into other types of tools. Thus during the forming of the nut barrel portion 2, in the construction illustrated, the shaving operation is performed by forcing the tool 7d over the barrel portion 2 of the nut device, supported on the disc 7e (FIG. 6), thereby shaving portions 8 from the wall thereof before the nut is removed from the tools. These shaved portions 8 provide for the flat surfaces 4 on the outer wall 5 and they need not be removed but remain adjacent the base flange 1. To provide for removal of the shaved portions 8 would complicate the manufacturing tools and manufacturing operations as will be readily understood by anyone skilled in the art.

Since the shaved portions 8 do not interfere when the nut is used with a tool it is unnecessary to remove them. If a better appearing nut is desired the base flange 1 may be provided with an annular recess 9 (FIGS. 1 and 2) and the shaved portions 8 are pressed into this recess 9. This arrangement also protects a user of the nut from being cut or scratched by contact with sharp or rough edges of the shaved portions 8 which might occur if the recess 9 is not provided.

One use of the nut is shown in the installation disclosed by FIGS. 1 and 2 wherein a support 10 presents a bolt or screw member 11 passing into a hole 12 in a part 13 and a nut device is threaded onto the screw member 11 and fits into a recess 14, as best shown in FIG. 2. Other uses of the nut will be apparent by anyone needing a nut where a wrench-type tool is used. With this improved nut a better grip will be provided with a tool than when a screwdriver slot is used or the edge of a relatively thin base flange is shaped to engage with a tool.

While an improved nut device and method of making the same have been illustrated and described it should be understood that the invention is best defined by the following claims.

I claim:

A threaded nut device formed from drawn sheet metal and having a thin walled barrel portion provided with an internal circular wall threaded to engage a screw shank and an outer wall having a plurality of wrench engaging outer surfaces extending lengthwise of the barrel portion only, said nut also having shaved portions extending from said barrel portion adjacent ends of the wrench engaging flat surfaces, a flange at one end of said barrel portion having an annular recess therein and said shaved portions located in said recess.

References Cited by the Examiner

UNITED STATES PATENTS

| 1,027,457 | 5/12 | Zerk | 10—81 |
| 2,208,532 | 7/40 | Woodward | 151—41.72 |
| 2,632,355 | 3/53 | Becker | 85—32 |
| 2,672,659 | 3/54 | Becker | 85—32 |

FOREIGN PATENTS 26,113  11/10  Great Britain.

EDWARD C. ALLEN, Primary Examiner.